Patented Nov. 13, 1945

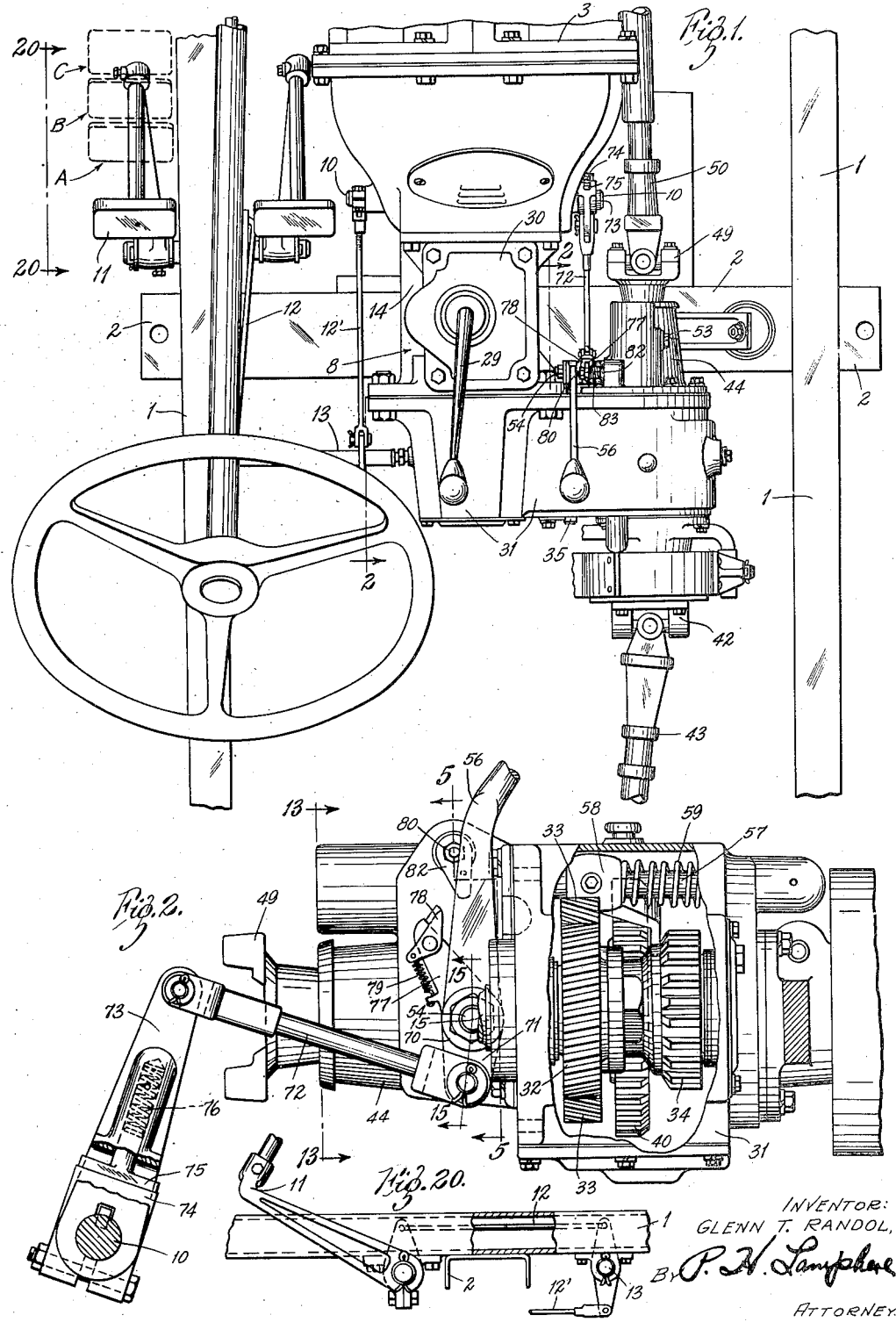

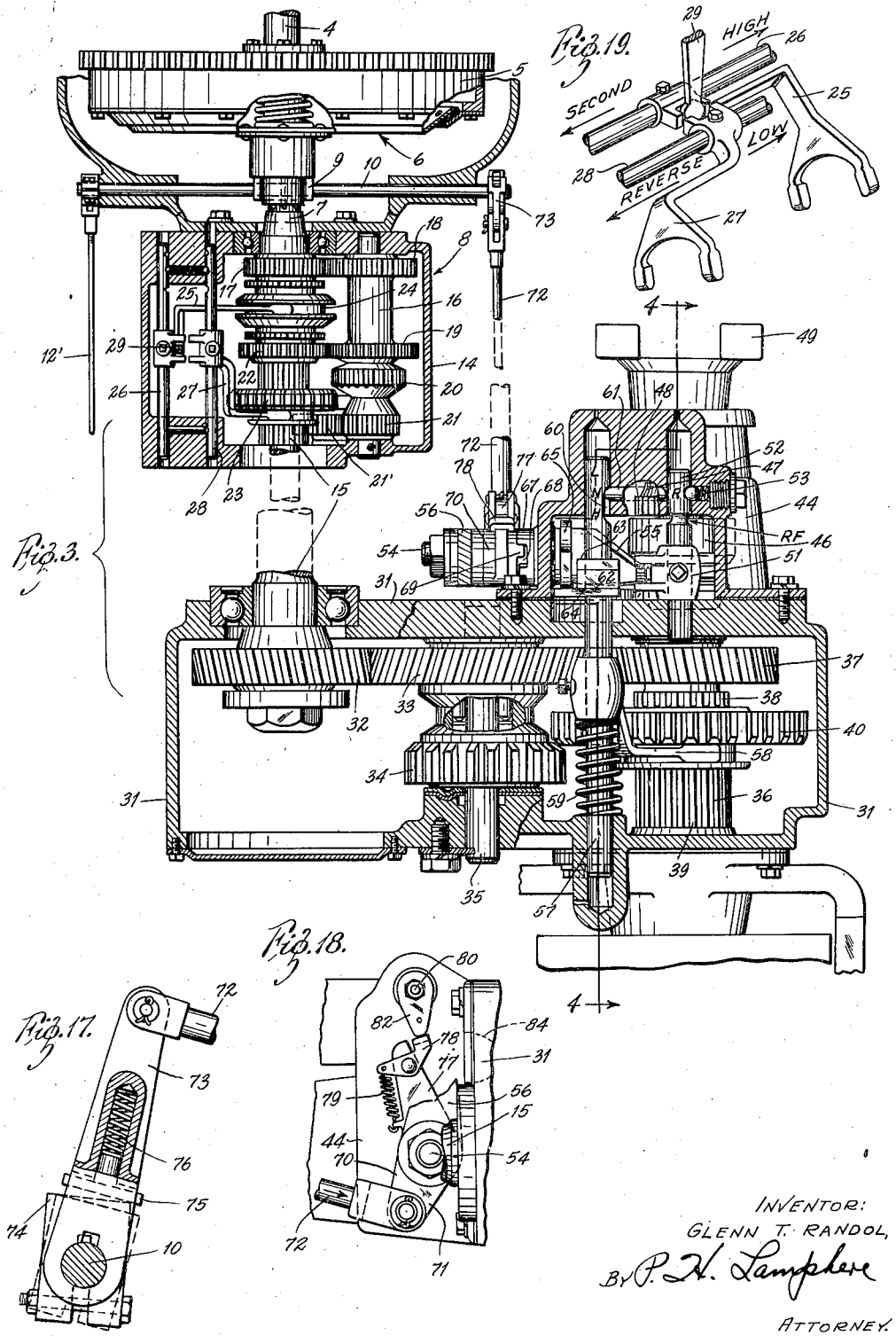

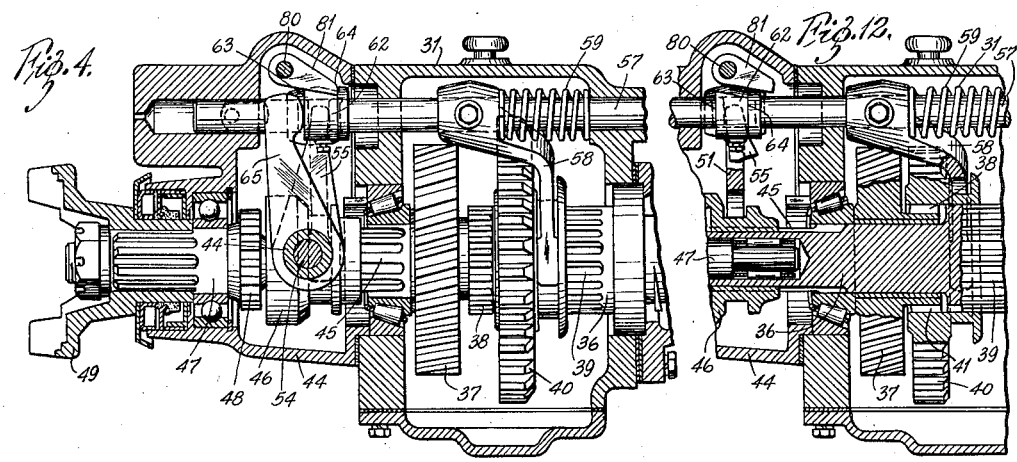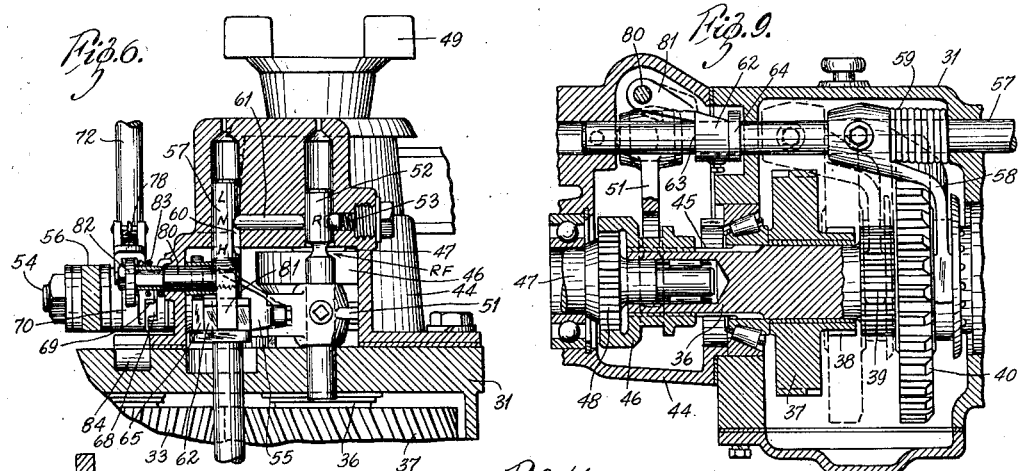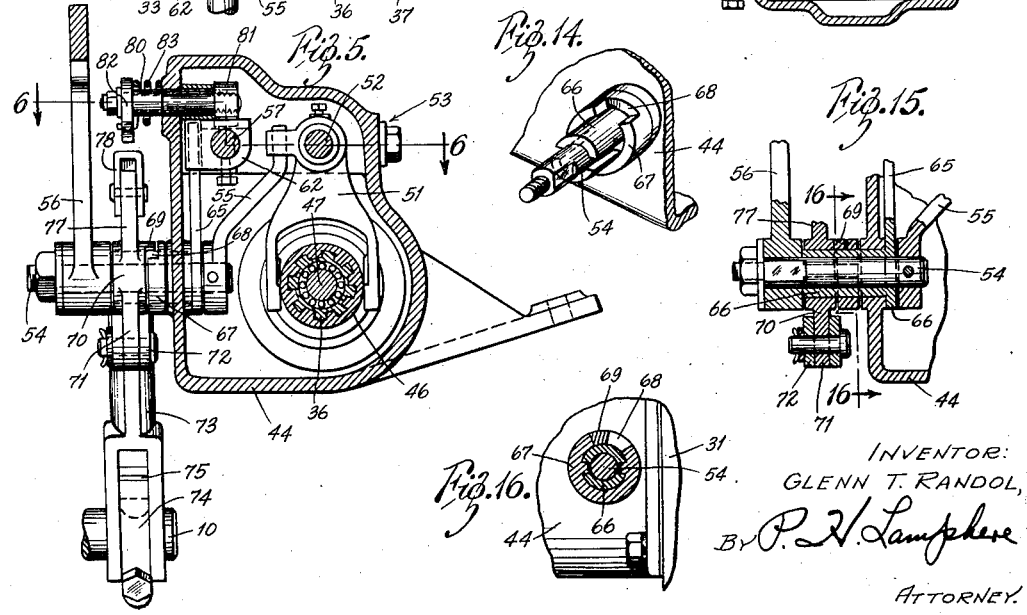

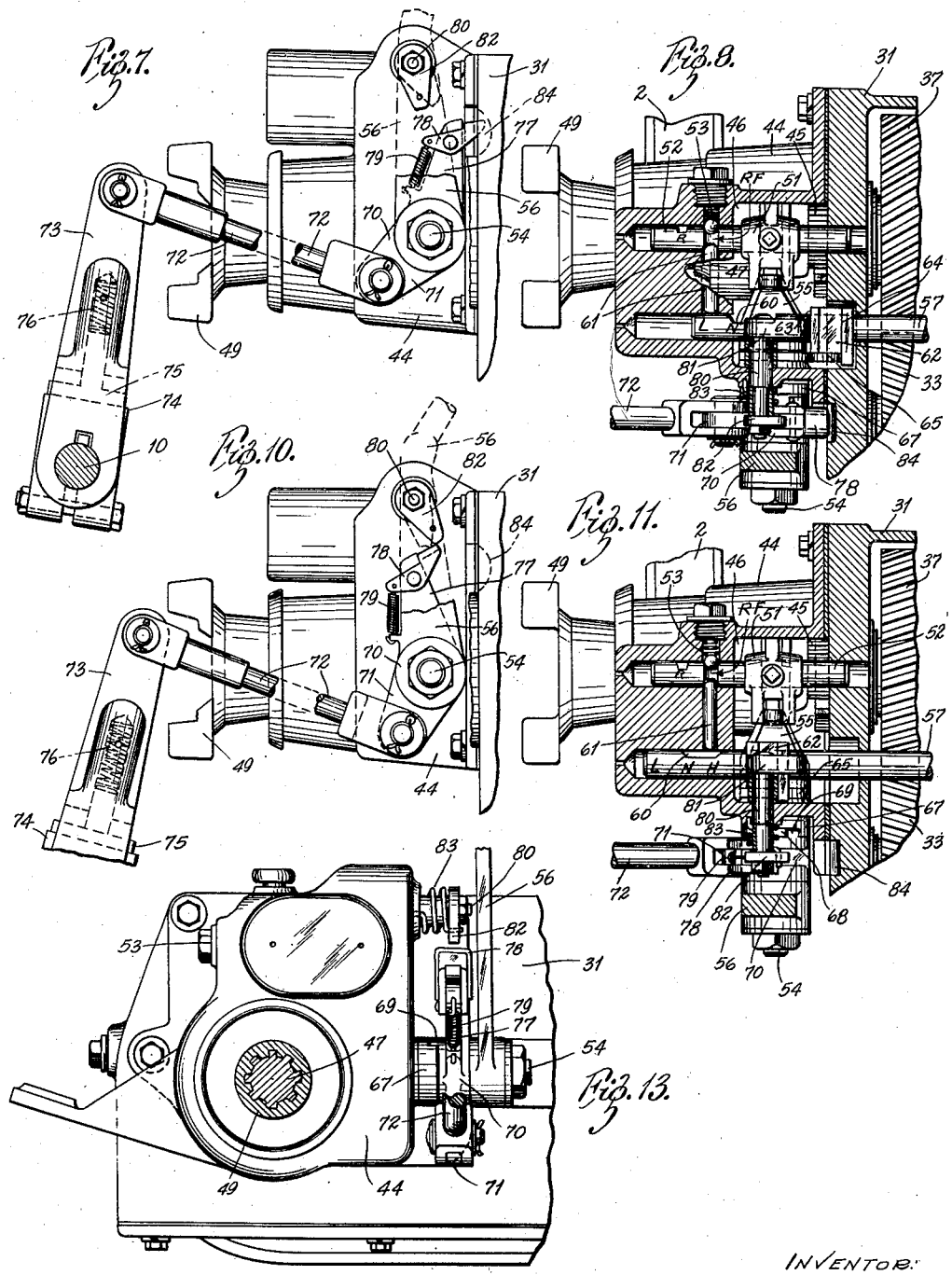

2,388,763

UNITED STATES PATENT OFFICE 2,388,763

TRANSMISSION CONTROL MECHANISM

Glenn T. Randol, St. Louis, Mo.

Application April 12, 1943, Serial No. 482,732

21 Claims. (Cl. 192—3.5)

My invention relates to control mechanism for a change speed gearing system of a vehicle and more particularly to such a system employing a main change speed gearing and an auxiliary change speed gearing.

One of the objects of my invention is to simplify the control operations of a vehicle provided with a main and auxiliary transmission system employable to drive both the front and rear axles of the vehicle or the rear axle independently.

Another object of my invention is to provide improved foot-operated control means for shifting the shiftable member of an auxiliary two-speed gearing unit.

A more specific object of my invention is to associate said control means with the usual clutch disengaging pedal for the main clutch so that the shiftable member of the auxiliary two-speed unit can be placed in either of its two speed ratios or in neutral position by depressing the pedal to three different positions beyond clutch-disengaged position.

Yet another object of my invention is to embody means in the control means which will permit the operator to be aware of the condition of the gearing when operating the vehicle.

Another object of my invention is to incorporate means in a control mechanism for a gearing system of the kind referred to which will prevent the use of the lower gear ratio of the auxiliary two-speed gearing unit when only the rear axle of the vehicle is being driven.

Other objects of my invention will become apparent from the following description taken in connection with the accompanying drawings in which Figure 1 is a top view of a portion of a motor vehicle showing a main and auxiliary change speed gearing system for driving both front and rear axles of the vehicle together with the control means therefor embodying my invention; Figure 2 is a view taken on the line 2—2 of Figure 1, said view having parts broken away and showing certain details of the auxiliary change speed unit and the control mechanism therefor, the gearing and control mechanism being shown in their normally inoperative positions; Figure 3 is another top view of the main and auxiliary gearings showing details of the main and auxiliary gearing system and the control mechanism; Figure 4 is a sectional view taken on the line 4—4 of Figure 3; Figure 5 is a sectional view taken on the line 5—5 of Figure 2; Figure 6 is a sectional view showing additional details of part of the mechanism for controlling the auxiliary two-speed gearing and the front axle coupling, the gearing being in neutral and the front axle coupling engaged; Figure 7 is a view of a portion of the structure shown in Figure 2 but showing the control mechanism in a position corresponding to low gear ratio with the front axle coupling engaged; Figure 8 is a view similar to Figure 6, showing parts of the control mechanism in low speed ratio position and the front axle coupling engaged; Figure 9 is a view similar to Figure 4 but showing the auxiliary gearing unit and the control parts in positions corresponding to low speed ratio with the front axle coupling engaged; Figure 10 is another side view similar to Figure 7 but showing the parts of the control mechanism in the high speed gear ratio position with the front axle coupling engaged; Figure 11 is another view similar to Figure 6 but showing the parts in high gear ratio position with the front axle coupling engaged; Figure 12 is a view similar to Figure 9, showing the parts moved to high gear ratio position with the front axle coupling engaged; Figure 13 is a front view of the auxiliary two-speed gearing and the control mechanism as veiwed in the direction of the arrows on the line 13—13 of Figure 2; Figure 14 is a perspective view, showing the control shaft which enters the auxiliary gearing casing and parts associated therewith; Figure 15 is a sectional view taken on the line 15—15 of Figure 2; Figure 16 is a sectional view taken on the line 16—16 of Figure 15; Figure 17 is a partial sectional view, showing an operative condition of the connecting arm between the main clutch disengaging shaft and the remainder of the control mechanism for the auxiliary gearing; Figure 18 is another view of the parts of the control mechanism on the exterior of the auxiliary casing but showing them in a position assumed during the movement of the control mechanism to its normally inoperative position; Figure 19 is a perspective view of the shifter forks and gear shifting lever employed in shifting the elements of the main change speed gearing unit; and Figure 20 is a view of the parts of the connection between the clutch pedal and the clutch operating shaft, said view being taken as indicated by the line 20—20 of Figure 1.

Referring to the drawings in detail and first to Figures 1, 3, 4, 19, and 20, numeral 1 indicates a frame of a motor vehicle having a cross-support 2. The engine 3, which is supported by the frame, has a crankshaft 4 connected to the flywheel 5 with which is associated the main friction clutch member 6. This clutch member is splined to the transmission drive shaft 7 of the main transmission gearing 8 and is operated by a clutch lever 9 secured to a clutch shaft 10 extending across the clutch housing. The shaft 10 is connected to be operated by the usual clutch pedal 11, said connection comprising rods 12 and 12' and a shaft 13 provided with arms and being pivoted on the frame (see Figures 1 and 20). When the clutch pedal 11 is depressed, the main clutch member 6 will be disengaged and when the pedal is released, the main clutch member will become re-engaged to permit the crankshaft to drive the driving shaft 7 of the main change speed gearing.

The change speed gearing 8 is positioned in a casing 14 mounted on cross-support 2 and is of well-known construction comprising a splined driven shaft 15 in axial alignment with the driving shaft 7 and a countershaft 16 at one side of the driving and driven shafts. The countershaft is constantly driven from the driving shaft by gears 17 and 18 and has mounted thereon a second speed gear 19, a low speed gear 20, and a reverse gear 21. The driven shaft 15 has rotatably mounted thereon a second speed gear 22 constantly meshing with gear 19 and to the rear thereof a slidable combined low and reverse speed gear 23 capable of meshing with the low speed gear 20 on the countershaft or an idler gear 21' constantly driven by the reverse gear 21. Between the second speed gear 22 on the driven shaft and gear 17 on the driving shaft is a double clutch member 24 whereby the second speed gear 22 can be connected to the driven shaft to obtain second speed ratio or the driving shaft connected to the driven shaft to obtain direct or high speed drive. The clutch member 24 is controlled by a shifting fork 25 mounted on a shifting rod 26 slidable in the gear casing 14. The combined low and reverse gear 23 is also controlled by a shifting fork 27 secured to a rod 28 positioned parallel with rod 26. The two rods 26 and 28 are adapted to be controlled by the usual selecting gear shift lever 29 universally mounted in the cover plate 30 of the gear casing. It is thus seen that the main change speed gearing 8 is controllable by proper manipulation of the gear shift lever 29. Thus the driven shaft 15 of the gearing can be driven from the engine through either reverse, low, second, or high gear ratio.

Secured to the rear end of the main gear casing 14 is a transfer casing 31 into which the driven shaft 15 of the main change speed gearing projects. Mounted on the end of driven shaft 15 in this transfer casing is a gear 32 which constantly drives the gears of an auxiliary two-speed gearing contained in the transfer casing.

The auxiliary two-speed gearing has integral gears 33 and 34 mounted on a shaft 35 in the casing, gear 33 being the largest and constantly meshing with gear 32. The transfer casing also has journaled therein a shaft 36 positioned parallel with shaft 35. Rotatably mounted on shaft 36 is a gear 37 provided with clutch teeth 38 and being constantly in mesh with the previously mentioned gear 33 on shaft 34. It is thus seen that gear 37 is driven whenever power is transmitted to the driven shaft 15 of the main change speed gearing. The shaft 36 is provided with splines 39 and slidably mounted on these splines is a gear 40 provided with internal teeth 41 (see Figure 12). The gear 40 is adapted to cooperate with the previously mentioned gear 34 and the internal clutch teeth 41 are adapted to cooperate with the previously mentioned clutch teeth 38 on gear 37. Gear 40 has a central neutral position, as indicated in Figures 2 and 3, wherein the gear is not in mesh with gear 34 and the clutch teeth 41 are not in engagement with clutch teeth 38. Thus it is seen that under these neutral conditions gears 33, 34, and 37 may be constantly driven but power is not transmitted to shaft 36. When gear 40 meshes with gear 34, power can be transmitted to shaft 36 through these gears and when gear 40 is moved so that clutch teeth 41 engage clutch teeth 38, power can be transmitted through gear 37 to shaft 36 at a higher ratio.

As best shown in Figures 1, 3, 4, and 9, the rear end of shaft 36 is connected by a universal joint 42 to a propeller shaft 43 leading to the rear axle of the vehicle for driving the rear wheels associated therewith, the driving connection including the usual differential gearing (not shown). The forward end of shaft 36 extends into a casing 44 secured to the forward end of transfer casing 31 and cross-support 2, said casing being positioned alongside the main gear casing 14. This forward end of shaft 36 is provided with splines 45 upon which is slidable an internally toothed clutch element 46 forming part of a coupling. Piloted into the splined end of shaft 36 is a short shaft 47 journaled in casing 31. This shaft is provided with external clutch teeth of a clutch element 48 and said teeth are adapted to cooperate with the internal teeth of the slidable element 46, thus completing the coupling. As best shown in Figure 1, the outer end of short shaft 47 is connected by a universal joint 49 to a propeller shaft 50 leading to the front axle of the vehicle for driving the wheels associated therewith, there being suitable differential gearing between the propeller shaft and the wheels. From this construction it is seen that if the slidable element 46 of the coupling is engaged with element 48, any power being transmitted to shaft 36 will also be transmitted to the front wheels of the vehicle. If the clutch element 46 is disengaged from teeth 48, no power will be transmitted to the front wheels.

Referring now to Figures 1 to 18, the features of my improved control mechanism will be described. The slidable clutch element 46 of the front axle drive coupling is controlled by a gear shifting fork 51 which is secured to a slidable rod 52 mounted in the top portion of casing 44 and also having a bearing in the adjacent end of the transfer casing 31. This rod has a recess R and an annular groove RF meaning rear axle drive only and both rear and front axle drive, respectively. Cooperating with this recess and groove is a spring-pressed ball detent 53. When the slidable clutch element 46 is in engagement with the teeth of clutch element 48, the detent will cooperate with the RF groove and because of the engaged condition of the coupling, the front axle can be driven. When the detent is in the R recess, the coupling will be disengaged and the front axle will not be driven by shaft 36 when power is transmitted thereto. Extending into casing 44 through the wall thereof is a shaft 54 which has secured to its inner end an arm 55. The free end of this arm fits into a slot in the shifting fork 51. Thus by rotating shaft 54, the shifting fork can be moved back and forth to cause the coupling to be engaged and disengaged. The outer end of the shaft has secured thereto a hand lever 56 which extends upwardly into the operator's compartment along side the gear shift lever 29 for the main change speed gearing 8. Thus the operator, by moving lever 56 back and forth, can control the engagement and disengagement of the coupling at will.

Also slidably mounted in the top portion of casings 44 and 31 is another rod 57 positioned parallel to rod 52 which controls the coupling. The portion of the rod in the transfer casing 31 has secured thereto a shifting fork 58 for controlling the slidable gear 40 and the internal teeth 41 carried thereby. Rod 57 is normally biased by a coil spring 59 surrounding the rod and interposed between the shifting fork and a wall of casing 31 so that the fork and gear 40 are in a position where the internal teeth 41 are engaged with teeth 38 on gear 37 of the auxiliary two-speed gearing.

The forward end of rod 57 is provided with an elongated recess 60 for cooperation with an interlocking pin 61 which pin also cooperates with rod 52 for controlling the coupling. The rod 57 has three positions which are indicated as H, N, and L and mean high gear ratio of the auxiliary two-speed gearing, neutral, and low speed ratio, respectively. These positions are indicated on the portion of the rod adjacent the interlocking pin 61. The elongated recess 60 permits movement of rod 57 only between the N and H positions if the interlocking pin 61 is forced into the recess by rod 52 being in a position where the coupling is disengaged (detent 53 in the R recess). Under these conditions, gear 40 cannot be engaged with gear 34 for low speed ratio (L position of rod 57). If rod 52 is in a position where the coupling is engaged (detent in RF groove), then the interlocking pin will cooperate with the RF groove in said rod 52 permitting rod 57 to be moved to any of its three positions H, N, or L. Thus it is seen that when the front axle coupling is disengaged, it will only be possible to neutralize the auxiliary two-speed gearing by moving gear 40 to neutral or to place the auxiliary two-speed gearing in its high gear ratio by engaging teeth 41 with teeth 38. If the front axle coupling is engaged, both the front and rear axle drives can be driven and the auxiliary two-speed gearing can be placed in neutral, high, or low by proper movement of gear 40.

On the forward end of rod 57 which is positioned in casing 44 there is secured a collar 62 providing two shoulders 63 and 64. Cooperating with the side portion of shoulder 64 is one end of an arm 65, the other end of said arm being provided with a sleeve 66 which is rotatably mounted on shaft 54 and extends to the exterior of the casing 44 (see Figures 14, 15, and 16). Splined on the outer portion of this sleeve 66 is a collar 67 having a slot 68 for receiving a lug 69 smaller than the slot and carried by a lever 70 rotatably mounted upon the sleeve 66 between the collar and the previously referred to hand-operated lever 56 which controls shaft 54.

Lever 70 has a downwardly extending arm 71 which is connected by means of a rod 72 with an arm 73 provided with a forked end rotatably mounted on the end of the previously referred to main clutch operating shaft 10. This forked end receives a block 74 which is secured to shaft 10. Carried by lever 73 is a shoe 75 for cooperation with this block, said shoe being biased by a spring 76 for engagement with a flat surface on the block. Spring 76 is of such strength that it will hold the shoe in engagement with the block so that when shaft 10 is rotated, arm 73 will be normally rotated therewith. However, if arm 73 is prevented from rotating, shaft 10 can, nevertheless, be rotated relatively to the arm due to the yielding of the spring-backed shoe 75. When the force holding arm 73 from rotation is relieved, the force action of spring 76 and shoe 75 will be great enough to move arm 73 and the control mechanism so that the normal relationship between the block and the shoe will again be resumed.

The lever 70, which has been previously noted as being mounted on sleeve 66, is also provided with an upstanding arm 77 and carried by the upper end of this arm is a pivoted member 78 biased against said arm by a spring 79. Journaled in casing 44 above rod 57 is a shaft 80, the inner end of which is provided with a dog 81 overlying rod 57 and adapted to cooperate with the top portions of the two shoulders 63 and 64 established by the collar 62. The outer end of shaft 80 has secured thereon a short arm 82 for cooperation under certain conditions with the spring-biased member 78 carried by the upper end of arm 77. A coil spring 83 is connected to the arm and to the casing and operates to bias shaft 80, arm 82 and dog 81 in a clockwise direction as viewed in Figures 2, 7, 10, and 11 so that dog 81 will be conditioned to engage shoulders 63 and 64. In order that the pivoted member 78 carried by the upper end of arm 77 will not abut casing 31 during the operative movement of the arm, the casing is provided with a recess 84.

Referring now to the operation of my simplified control mechanism, let it be assumed that the main change speed gearing 8 is in neutral position as shown in Figure 3. Under these conditions no power will be transmitted to the driven shaft 15 and, therefore, no power to the wheels of the vehicle regardless of the condition of the auxiliary two-speed gearing or the front axle coupling. Let it be assumed that the auxiliary two-speed gearing is in its high speed ratio with gear 40 in the position indicated in Figure 12 where teeth 41 engage teeth 38. Let it also be assumed that the front axle coupling is engaged. Under these conditions the parts of the control mechanism and the gearing will be in the positions shown in Figures 11 and 12. The main change speed gearing may now be controlled by the gear shift lever 29 to connect drive shaft 7 to shaft 15 and transmit power to both the rear and front axles through the highest speed ratio of the auxiliary two-speed gearing. To transmit power, the clutch pedal 11 may be moved to clutch-disengaged position A, the gears of the main change speed gearing shifted in the usual manner, and the clutch reengaged. During the disengaging movement of the clutch pedal to position A, the arm 73, rod 72, and lever 70 will be moved to the positions shown in Figure 10 but rod 57 will not be shifted due to the lost motion arrangement between lug 69 on lever 70 and slot 68 in collar 67 (see Figures 11, 14, 15, and 16).

If it should now be desired to lower the ratio of the auxiliary two-speed gearing, all that need be done is to push the clutch pedal completely to the floorboard or to the position marked C in Figure 1. This movement of the clutch pedal disengages the clutch when position A is reached and at this point lug 69 on lever 70 picks up collar 67. Continued movement of the pedal rotates sleeve 66 and arm 65 in unison. Since arm 65 engages shoulder 64 on rod 57, said rod will be moved rearwardly against the bias of spring 59. The movement of the clutch pedal from position A to position C will thereby cause rod 57 and gear 40 to be moved rearwardly so that teeth 41 are disengaged from teeth 38 and gear 40 is meshed with gear 34 so that the lowest speed ratio of the auxiliary two-speed gearing is effective. When gear 40 reaches the meshed position with gear 34, dog 81 will drop behind shoulder 63 of collar 62 on rod 57 and thus lock the gear in its operative position and prevent spring 59 from unmeshing the gear. When the clutch pedal now allows the clutch to reengage, power will be transmitted to both the front and rear axles. It is to be noted that during the depressing of the clutch pedal to position C, arm 77 of lever 70 will be moved from its position shown in Figure 2 to its position shown in Figure 7 and during this movement the spring-biased pivoted member 78 will engage arm 82 and push it aside (as shown in Figure 10) so as to pass beyond it to the position shown in Figure 7. Since shaft 80, which carries arm 82 and also dog 81, is spring-biased, the dog will be positioned behind shoulder 64 as soon as the pivoted member 78 passes arm 82. When the main clutch is permitted to reengage, pivoted member 78 will yield and pass arm 82 without disturbing it during the return movement of lever 70. The condition of the control mechanism and the auxiliary gearing when low speed ratio is operative and the coupling engaged is shown in Figures 9 and 11.

If it should be again desired to place the auxiliary two-speed gearing in high speed ratio (teeth 41 engaged with teeth 38), the clutch pedal will be moved to the position marked A. This will bring lever 70 to the position shown in Figure 10 wherein the pivoted member 78 will engage arm 82 and swing it in a counter-clockwise direction to the position indicated in full lines in said Figure 10. Shaft 80 will be rotated and dog 81 will be raised and disengaged from shoulder 64. This frees the rod 57 and permits spring 59 to shift gear 40 out of mesh with gear 34 and teeth 41 into engagement with teeth 38, thus restoring the high speed ratio condition. The drive will again be transmitted through this high speed ratio whenever the main clutch is re-engaged.

It is to be noted that with the auxiliary two-speed gearing in either gear ratio, the main change speed gearing 8 can be shifted to obtain any desired ratio by merely depressing the clutch pedal to the position A, shifting lever 29, and then re-engaging the clutch as is usual practice. It is also to be noted that during shifting back and forth from the higher speed ratio to the lower speed ratio of the auxiliary gearing, the interlock will not in any way interfere with the full movement of rod 57 since pin 61 is pushed aside into the RF groove of rod 52.

If it should be desired to drive the vehicle by the rear axle independently of the front axle, such can be done only when the auxiliary two-speed gearing is in its highest gear ratio condition. Assuming that it is in this condition, that is, with gear 40 in a position where teeth 41 engage with teeth 38, all that need be done to disconnect the front axle drive is to disengage the main clutch by depressing the pedal to the position A and then while the clutch is disengaged, grasp lever 56 and move it rearwardly. This will cause shaft 54 and arm 55 to be rotated and rod 52 moved so that detent 53 engages the R recess. When rod 52 is so moved, fork 51 moves clutch element 46 of the coupling to the disengaged position shown in Figure 4. Re-engagement of the main clutch by release of the clutch pedal will now result in the rear axle of the vehicle only being driven. When rod 52 assumes the position where the detent is in recess R, the interlocking pin 61 will be shifted into the elongated recess 60 of rod 57.

When the front axle coupling is disengaged and the drive is being transmitted only to the rear axle through the highest ratio of the auxiliary two-speed gearing, it will be impossible to place the two-speed gearing in the lowest speed ratio because of the action of the interlocking pin, it being noted from viewing Figures 3 and 6 that the movement of rod 57 is now restricted solely to that permitted by the elongated recess 60. Such permissible movement of rod 57 will allow teeth 41 to be disengaged from teeth 38 and the auxiliary two-speed gearing to be in neutral condition where no power is transmitted to shaft 36 upon which gear 40 is splined.

If it should be desired to cause high speed ratio to be inactive and place gear 40 in its neutral position, such may be done by merely moving the clutch pedal 11 to the position B. This will cause rod 57 to be moved rearwardly to where the interlock is at the end of the recess marked N. At this point the dog 81 will drop behind shoulder 64 and thus prevent spring 59 from so moving gear 40 as to re-engage teeth 41 with teeth 38. This neutral condition of the auxiliary two-speed gearing is very seldom used since under normal procedure when it is desired to neutralize the gearing, such is done by neutralizing the main change speed gearing 8 by operation of the gear shift lever 29. The neutralization of the auxiliary two-speed gearing is usually desirable only under conditions where a power take-off is associated with the driven shaft 15 (not shown). Thus it is seen that by neutralizing the auxiliary two-speed gearing, power can be transmitted to the driven shaft 15 without driving either the front or the rear wheels of the vehicle. This neutral condition of the gearing can also be obtained if the front axle coupling is engaged by merely moving the clutch pedal to the position marked B and then releasing it.

Although the low speed ratio of the auxiliary two-speed gearing cannot be obtained when the front axle coupling is in a disengaged condition, it is possible to automatically obtain this ratio when hand lever 56 is shifted to a position engaging the coupling, provided the clutch pedal is fully depressed to position C at the time the front axle drive coupling is caused to be engaged. Assuming that the coupling is disengaged and the auxiliary two-speed gearing is in its highest speed ratio, that is, teeth 41 engaged with teeth 38, then if the clutch pedal is moved to position C, the main clutch will be disengaged and arm 73 on the end of the clutch shaft will be moved only to the position shown in Figure 17. Further movement thereof will be prevented due to the action of the interlock since the end of recess 60 will engage it and prevent gear 40 from meshing with gear 34. The gear 40, however, will assume its neutral position wherein teeth 41 are disconnected from teeth 38. Notwithstanding the inability of rod 57 to be moved to obtain low speed ratio, the clutch pedal can be placed in position C. Such is permitted by the spring 76 and shoe 75 on arm 73 as these will yield and permit the clutch shaft and block 74 to be moved to the position corresponding to clutch pedal position C and shown in full lines in Figure 17. With the clutch pedal in position C, the operator now need only engage the coupling by shifting lever 56 forwardly. Such engagement will result in rod 52 moving to the position where detent 63 is in groove RF. When this condition is obtained, the interlocking pin 61 is shiftable and can no longer hold rod 57. The force of spring 76 now operates on shoe 75 and throws lever 73 forwardly so that the shoe fully engages the top surface of block 74. This position is shown in Figure 7. As lever 73 moves forwardly, rod 57 will be shifted rearwardly and gear 40 engaged with gear 34 where it will be locked by dog 81 cooperating with shoulder 63 (see Figure 9). Spring 76 is strong enough to overcome spring 59 on rod 57 and compress this latter spring to make the shift of rod 57. Thus it is seen that with the clutch pedal fully depressed to C position, all that need be done to cause low speed ratio to be active and the front axle driven with the rear axle is to merely engage the front axle coupling by shifting lever 56. When the main clutch is again re-engaged, both the front and rear axles will be driven through the low speed ratio of the auxiliary two-speed gearing.

From the description of the operation of my improved control mechanism it is obvious that the operator will always be fully aware of the condition of the auxiliary two-speed gearing and the coupling for the front axle drive. By a glance at the position of lever 56, the operator will know whether the coupling is engaged or disengaged. If the lever is in the rearward position, the operator will know that the auxiliary two-speed gearing is in its highest speed ratio as this is the only speed ratio which can be effective under such conditions. If lever 56 is in its forward position, he will know that the front axle drive coupling is engaged. The "feel" of additional resistance caused by spring 59 when the clutch pedal moves to positions A, B, and C will inform him whether the auxiliary two-speed gearing is either in low, neutral, or high speed ratio. If it is in high speed ratio, he will know this when he depresses the clutch pedal beyond clutch-disengaged position for as soon as the pedal is beyond the clutch-disengaged pedal position A, he will feel the resistance of spring 59 and if he wants to remain in the high speed gear ratio, he will not move the pedal against this resistance. If he should desire to place the auxiliary two-speed gearing in low speed ratio knowing it is in a higher speed ratio, he will simply move the clutch pedal to the position C and the shift will be automatically obtained. If the auxiliary gearing is in low speed ratio, he will be aware of such as the resistance of spring 59 is not present. If the higher speed ratio is now desired, he need only depress the clutch pedal to the position A which is sufficient to release dog 81 from shoulder 63, thus freeing rod 57 so that spring 59 can become operative to shift gear 40 and cause teeth 41 to engage with teeth 38. If it is in high speed ratio and he desires to neutralize the auxiliary two-speed gearing, he need only push the clutch pedal to position B. This will shift gear 40 to its neutral position and result in dog 81 engaging shoulder 64 to thus hold the gear in neutral position. If the front axle drive coupling should be disengaged and he should desire to have the low speed ratio of the auxiliary two-speed gearing effective in driving both the front and rear axles, all that need be done is to fully depress the clutch pedal to the position C and then engage the coupling by lever 56. When this is done, gear 40 will be automatically moved to mesh with gear 34 by the action of spring 76 in the manner already described. When the front axle drive coupling is disengaged, the operator cannot obtain low speed ratio by merely moving the clutch pedal due to the interlock. It is also to be noted that the operator will know if the gearing is in low speed ratio with the coupling engaged since under these conditions he can disengage the coupling due to the condition of the interlocking pin as it will be held in groove RF.

Thus it is seen from the above summary of the operation of the control mechanism that the shifting of the auxiliary two-speed gearing is considerably simplified. The operator is not required to employ any hand lever in addition to the gear shift lever 29 and the coupling controlling lever 56 to change the gear ratio of the auxiliary two-speed gearing as is required in presently known control mechanisms. He does this entirely by his foot in operating the clutch pedal. Thus if he is driving the vehicle through any gear ratio of the main change speed gearing and either gear ratio of the auxiliary two-speed gearing and he desires to change the ratio of the auxiliary two-speed gearing, he can do this simply by depressing the clutch pedal provided, of course, the front axle drive coupling is engaged. It is under such conditions where the front and rear axle drive is being used that shifting of the ratio of the auxiliary two-speed gearing is desirable. This is easily accomplished by the control mechanism described. Even if low speed ratio is desired to be effective in the auxiliary two-speed gearing and the front coupling is disengaged, such ratio can be obtained by merely making one hand operation, that is, moving lever 56. The other required operation is merely the depressing of the clutch pedal to the fullest extent which is really no more of an operation than what is already required of the foot since the main clutch must be operated anyhow when ratio changing is being made. By simplifying the control mechanism for the change speed gearing system shown, the operator is not called upon to perform numerous operations with his hand as would be the case where a hand lever is employed to control the shifting of gear 40. Thus with a freer use of his hands, the operator can operate other mechanisms or perform other duties and better maneuver the vehicle.

The particular gearing system with which I have associated my improved control mechanism is that now employed on small military trucks commonly known as "Jeeps." With my simplified shifting mechanism on such trucks, the vehicle operator has a greater freedom of use of his hands, particularly the right hand and yet can control the shifting of the gearing in a much quicker manner entirely free of mental and physical coordination. This is very important on military vehicles because during battle or maneuvers the operator can use his right hand to a greater extent in assisting other persons to perform combat operations. The more the vehicle operator can be freed from vehicle operation duties, the more time he will have to perform other things not only when the vehicle is a military vehicle but even when used for other purposes.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In control mechanism for a vehicle driving system provided with an engine clutch, with a change speed gearing having a member shiftable to two speed ratio operative positions and means for operating said clutch, said control mechanism comprising spring means for biasing said member to one speed ratio operative position, mechanical connecting means between said clutch operating means and the shiftable member for shifting said shiftable member from said one speed ratio operative position to the other by a movement of the clutch operating means beyond clutch disengaging position, means for locking said shiftable member in the other position against the bias of the spring means and permitting re-engagement of the clutch by release of the operating means and without movement of the shiftable member, and means for releasing the locking means by a successive movement of the clutch operating means beyond clutch disengaging position but not such a movement as is required to establish the said other speed ratio.

2. In control mechanism for a vehicle driving system provided with an engine clutch, with a change speed gearing having a member shiftable to two speed ratio operative positions and a neutral position and means for operating said clutch, said control mechanism comprising spring means for biasing said member to one speed ratio operative position, mechanical connecting means between said clutch operating means and the shiftable member for shifting said shiftable member from said one operative position to either of the other positions by different movements of the clutch operating means beyond clutch disengaging position, means for locking said shiftable member in the other positions against the bias of the spring means and permitting re-engagement of the clutch by release of the operating means and without movement of the shiftable member, and means for releasing the locking means by a successive movement of the clutch operating means beyond clutch disengaging position but with less movement than that required to establish the said other speed ratio.

3. In control mechanism for a change speed gearing having a member shiftable to two speed ratio operative positions, a reciprocable rod connected to the shiftable member, a spring for biasing the shiftable member and rod to a position where the shiftable member is in one of its speed ratio operative positions, means for shifting said rod and member against the bias of the spring means to cause the shiftable member to be in its other speed ratio operative position, latch means for locking the rod in said last named position, and means movable with the means for shifting the rod for unlocking said latch means by a successive operation of said means for shifting the rod but with less movement than that required to establish the said other speed ratio.

4. In control mechanism for a change speed gearing having a member shiftable to two speed ratio operative positions, a reciprocable rod connected to the shiftable member, a spring for biasing the shiftable member and rod to a position where the shiftable member is in one of its speed ratio opertaive positions, means comprising an oscillatable member movable in one direction for shifting said rod and member against the bias of the spring means to cause the shiftable member to be in its other speed ratio operative position, latch means for locking the rod in said last named position, and means for unlocking said latch means by a successive operation of the means for shifting the rod, said last named means comprising a member movable with the oscillatable member and operable to unlatch the lock when the oscillatable member is moved in said one direction a distance less than that required to establish the other speed ratio but not in the opposite direction.

5. In a control mechanism for a change speed gearing having a member shiftable to three positions to establish two different speed ratios and to neutralize the gearing, spring means for biasing said member to one of its speed ratio operative positions, means for shifting said shiftable member to its two other positions against the spring means comprising a movable member movalbe to different positions, the speed ratio position being beyond the neutralizing position, latch means for locking the shiftable member in either of said two other positions and permitting release of force transmitted by the movable member of the shifting means, and means for releasing the latch means by a movement of the movable member of the shifting means and permitting the spring means to place the shiftable member in its said first position, the movement of the movable member to release the latch means being short of that required to establish the other speed ratio.

6. In a vehicle provided with two driven members, a change speed gearing having a driven shaft for driving both members simultaneously, means comprising a shiftable member for driving the shaft at two different speed ratios and a coupling for disconnecting the shaft from one driven member, control means for the shiftable member and the coupling, said control means comprising means for engaging and disengaging the coupling, foot-operated means for shifting the shiftable member to either of its two ratio positions, and means for preventing movement of the shiftable member to one of said ratio positions when the coupling is in disengaged condition.

7. In a vehicle provided with two driven members, a change speed gearing having a driven shaft for driving both members simultaneously, means comprising a shiftable member for driving the shaft at two different speed ratios and a coupling for disconnecting the shaft from one driven member, control means for the shiftable member and the coupling, said control means comprising means for engaging and disengaging the coupling, foot-operated means for shifting the shiftable member to either of its two ratio positions, and means for preventing disengagement of the coupling when it is in one of its speed ratio operative positions.

8. In a motor vehicle provided with a driving system for two driven members and comprising an engine clutch, clutch operating means, a change speed gearing having a driven shaft for driving both members and embodying a shiftable member for driving the shaft at two different speed ratios and a coupling for disconnecting the shaft from one driven member, control means for said driving system comprising means for engaging and disengaging the coupling, means for controlling the shiftable member by the clutch operating means after the clutch has been disengaged, and means for preventing the disengagement of the coupling when the shiftable member is in one of its speed ratio operative positions.

9. In a vehicle provided with two driven members, a change speed gearing having a driven shaft for driving both members simultaneously, means comprising a shiftable member for driving the shaft at two different speed ratios and a coupling for disconnecting the shaft from one driven member, control means for the shiftable member and the coupling, said control means comprising means for engaging and disengaging the coupling, spring means for biasing the shiftable member to one of its two ratio positions, means for shifting the shiftable member to its other operative position against the bias of the spring means, means for locking said shiftable member in said other ratio position, and means for preventing the movement of the shiftable member to said other ratio position by the shifting means when the coupling is in disengaged condition.

10. In a vehicle provided with two driven members, a change speed gearing having a driven shaft for driving both members simultaneously, means comprising a shiftable member for driving the shaft at two different speed ratios and a coupling for disconnecting the shaft from one driven member, control means for the shiftable member and the coupling, said control means comprising a hand lever connected for engaging and disengaging the coupling, spring means for biasing the shiftable member to one of its two ratio positions, pedal-operated means for shifting the shiftable member to its operative position against the bias of the spring means by movement of the pedal in one direction, means for locking said shiftable member in said other ratio position and means for releasing said locking means by a successive movement of the pedal in the same direction, and interlocking means for preventing movement of the shiftable member by the pedal to said other ratio position when the coupling is in disengaged condition.

11. In a motor vehicle provided with a driving system for two driven members and comprising an engine clutch, clutch operating means, a change speed gearing having a driven shaft for driving both members and embodying a shiftable member for driving the shaft at two different speed ratios and a coupling for disconnecting the shaft from one driven member, control means for said driving system comprising means for engaging and disengaging the coupling, means for shifting the shiftable member of the gearing to its two different speed ratio positions, means for controlling the shiftable member by the clutch operating means after the clutch has been disengaged, and means for preventing the shiftable member from assuming one speed ratio operative position when the coupling is disengaged.

12. In a motor vehicle provided with a driving system for two driven members and comprising an engine clutch, a clutch pedal, a change speed gearing having a driven shaft for driving both members and embodying a shiftable member for driving the shaft at two different speed ratios and a coupling for disconnecting the shaft from one driven member, control means for said driving system comprising means for engaging and disengaging the coupling, means for shifting the shiftable member of the gearing to its two different speed ratio positions, means for controlling the alternate shifting of the shiftable member to its two operative positions by successive movements of the clutch pedal beyond clutch-disengaged position, and means for preventing the shiftable member from assuming one speed ratio operative position when the coupling is disengaged.

13. In a motor vehicle provided with a driving system for two driven members and comprising an engine clutch, clutch operating means, a change speed gearing having a driven shaft for driving both members and embodying a shiftable member for driving the shaft at two different speed ratios, and a coupling for disconnecting the shaft from one driven member, control means for said driving system comprising means for engaging and disengaging the coupling, means for biasing the shiftable member to one of its speed ratio operative positions, means operable by the clutch operating means after disengagement of the clutch for shifting the shiftable member to the other speed ratio operative position against the bias of the spring means, latch means for locking the shiftable member in said other operative position, means for unlocking the latch means by operation of the clutch operating means, and means for preventing the movement of the shiftable member to said other speed ratio operative position when the coupling is disengaged.

14. In a vehicle provided with two driven members, a change speed gearing having a driven shaft for driving both members, means comprising a shiftable member for driving the shaft at two different speed ratios and a coupling for disconnecting the shaft from one driven member, control means for the shiftable member and the coupling, said control means comprising means for engaging and disengaging the coupling, a member movable to predetermined positions for shifting the shiftable member to either of its two ratio positions, means for preventing movement of the shiftable member to one of said ratio positions when the coupling is in disengaged condition, and yieldable means for permitting said shifting means to assume the predetermined position to perform the shift notwithstanding the shiftable member is prevented from movement by the last named means, said yieldable means being operative to automatically shift the shiftable member to said one ratio position in the event the coupling is moved from disengaged condition to engaged condition.

15. In a motor vehicle provided with a driving system for two driven members and comprising an engine clutch, clutch operating means, a change speed gearing having a driven shaft for driving both members and embodying a shiftable member for driving the shaft at two different speed ratios and a coupling for disconnecting the shaft from one driven member, control means for said driving system comprising means for engaging and disengaging the coupling, means for controlling the shiftable member by the clutch operating means after the clutch has been disengaged, means for preventing the movement of the shiftable member to one of its speed ratio positions when the coupling is disengaged, means for permitting the clutch operating means to assume its position normally causing shifting of the shiftable member when said one speed ratio position is prevented from being operative by the condition of the coupling, and means for automatically shifting the shiftable member when the clutch operating means is in said last named position and the coupling is engaged.

16. In a motor vehicle provided with a driving system for two driven members and comprising an engine clutch, a clutch pedal, a change speed gearing having a driven shaft for driving both members and embodying a shiftable member for driving the shaft at two different speed ratios and a coupling for disconnecting the shaft from one driven member, control means for said driving system comprising means for engaging and disengaging the coupling, means for controlling the alternate shifting of the shiftable member to its two operative positions by successive movements of the clutch pedal beyond clutch-disengaged position, means for preventing the shiftable member from assuming one speed ratio operative position when the coupling is disengaged, and spring means permitting the clutch pedal to be moved to its normal shifting position beyond clutch-disengaged position notwithstanding the disengaged condition of the coupling prevents shifting of the shiftable member and for automatically shifting the shiftable member to said one speed ratio if the coupling is caused to be engaged under such conditions.

17. In a motor vehicle provided with a driving system for two driven members and comprising an engine clutch, clutch operating means, a change speed gearing having a driven shaft for driving both members and embodying a shiftable member for driving the shaft at two different speed ratios and a coupling for disconnecting the shaft from one driven member, control means for said driving system comprising means for engaging and disengaging the coupling, spring means for biasing the shiftable member to its highest speed ratio position, means for moving the shiftable member to its lower speed ratio position by the clutch operating means after the clutch has been disengaged, latch means for locking the shiftable member in the lowest speed ratio position, means for preventing the movement of the shiftable member to its lowest speed ratio position when the coupling is disengaged, means for permitting the clutch operating means to assume its position normally causing shifting of the shiftable member notwithstanding shifting is prevented by the disengaged condition of the coupling, and means for automatically shifting the shiftable member when the clutch operating means is in said last named position and the coupling is caused to be engaged from a disengaged condition.

18. In a control mechanism for a change speed gearing having a member shiftable to two positions to establish two different speed ratios, means for shifting said member from one speed ratio position to the other speed ratio position including a manually operable member, means for biasing the member in the position where the one speed ratio is established and for also presenting a yieldable resistance to movement of the manual member to establish the other speed ratio and thereby provide indicating means for the operator so as to inform said operator that said one speed ratio is established, means for holding the shifting member in the other speed ratio position when so positioned by the manually operable member and permitting free return of the manually operated member, and means for releasing the holding means by a subsequent movement of the manually operable member which is less than that required to establish the other speed ratio.

19. In a control mechanism for a change speed gearing having a member shiftable to two positions to establish two different speed ratios, means for shifting said member from one speed ratio position to the other speed ratio position including a manually operable member having a movement to a predetermined position to make the shift, means for establishing a resistance to the movement of the manually operable member to thereby provide indicating means for informing the operator the one speed ratio is established and that if the manually operable member is moved to the predetermined position the said other speed ratio will be established, means permitting the return of the manually operable member from the predetermined position after the shift is made, means for shifting the shiftable member to establish said other speed ratio when the said one speed ratio is established, and means for causing said last named means to operate and make the shift when the manually operable member is moved to a position short of the said predetermined position.

20. In a control mechanism for a change speed gearing having a member shiftable to two positions to establish two different speed ratios, spring means for biasing said member to the highest speed ratio position, means for shifting said shiftable member to the lower speed ratio position against the bias of the spring means including a force transmitting element movable from one position to another position, means for holding said shiftable member in the lower speed ratio position without the necessity of applying force thereto by the element of the shifting means and permitting the element to return to said one position, and means movable with the element for releasing the holding means by a movement of said element from the said one position to a position short of the other position required to establish the said lower speed ratio.

21. In a control mechanism for a change speed gearing having a member shiftable to two positions to establish two different speed ratios and said gearing having associated therewith a main clutch provided with a clutch pedal, spring means for biasing said shiftable member to the higher speed ratio position, means for shifting said shiftable member from the higher speed ratio position to the lower speed ratio position by a movement of the clutch pedal to a predetermined position beyond clutch disengaging position, means for holding said shiftable member in said lower speed ratio position against the bias of the spring means and permitting free return of the clutch pedal, and means for releasing said holding means by a subsequent movement of the clutch pedal beyond clutch disengaging position but short of the predetermined position.

GLENN T. RANDOL.